United States Patent
Skultety-Betz et al.

(10) Patent No.: US 7,956,794 B2
(45) Date of Patent: Jun. 7, 2011

(54) SHORT-RANGE RADAR HAVING A MULTIPLE SENSOR SYSTEM FOR DETERMINING THE LOCATION OF OBJECTS ENCLOSED IN A MEDIUM

(75) Inventors: Uwe Skultety-Betz, Leinfelden-Echterdingen (DE); Bjoern Haase, Stuttgart (DE); Michael Mahler, Linfelden-Echterdingen (DE); Ulli Hoffmann, Neiffern-Oeschelbronn (DE); Reiner Krapf, Reutlingen (DE); Christoph Wieland, Herrenberg-Kuppingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/589,401

(22) PCT Filed: Dec. 15, 2004

(86) PCT No.: PCT/EP2004/053487
§ 371 (c)(1),
(2), (4) Date: Jun. 8, 2007

(87) PCT Pub. No.: WO2005/081015
PCT Pub. Date: Sep. 1, 2005

(65) Prior Publication Data
US 2008/0036644 A1    Feb. 14, 2008

(30) Foreign Application Priority Data
Feb. 14, 2004   (DE) .......................... 10 2004 007 315

(51) Int. Cl.
*G01S 13/00*   (2006.01)
*G01V 3/00*   (2006.01)
*G01V 3/08*   (2006.01)

(52) U.S. Cl. .......... 342/22; 324/323; 324/326; 324/329; 342/52; 342/53

(58) Field of Classification Search .................... 342/22; 324/323, 326, 329
See application file for complete search history.

(56) References Cited

U.S. PATENT DOCUMENTS
4,099,118 A * 7/1978 Franklin et al. ............... 324/671
(Continued)

FOREIGN PATENT DOCUMENTS
JP          61090010          5/1996
(Continued)

OTHER PUBLICATIONS

"Improved Optical Positioining for GPR Based Structure Mapping", Doerksen, Kyle. Ninth International Conference on Ground Penetrating Radar, Proceedings of SPIE vol. 4758, 2002, pp. 503-507.*

*Primary Examiner* — Thomas H Tarcza
*Assistant Examiner* — Peter Bythrow
(74) *Attorney, Agent, or Firm* — Kenyon & Kenyon LLP (57) ABSTRACT

A radar device is described, in particular a hand-held short-range radar for determining the location of objects enclosed in a medium, including at least one radar sensor, which generates a first, high-frequency detection signal for penetrating a medium to be tested in such a way that information about an object enclosed in the medium can be obtained by measuring and analyzing the reflected detection signal of the radar sensor. At least one additional sensor is provided for generating at least one additional, second detection signal for obtaining information about the object enclosed in the medium. The method on which this radar instrument is based is also described.

21 Claims, 3 Drawing Sheets

U.S. PATENT DOCUMENTS

| | | | |
|---|---|---|---|
| 4,220,913 A * | 9/1980 | Howell et al. | 324/529 |
| 4,951,055 A * | 8/1990 | Katayama | 342/22 |
| 5,001,430 A * | 3/1991 | Peterman et al. | 324/326 |
| 5,192,952 A * | 3/1993 | Johler | 342/22 |
| 5,307,272 A * | 4/1994 | Butler et al. | 700/90 |
| 5,680,048 A * | 10/1997 | Wollny | 324/329 |
| 6,026,135 A * | 2/2000 | McFee et al. | 376/159 |
| 6,246,355 B1 * | 6/2001 | Miceli et al. | 342/22 |
| 6,415,666 B1 * | 7/2002 | Donskoy et al. | 73/627 |
| 6,501,414 B2 * | 12/2002 | Arndt et al. | 342/22 |
| 6,667,709 B1 * | 12/2003 | Hansen et al. | 342/22 |
| 6,670,906 B1 * | 12/2003 | Roberts et al. | 342/22 |
| 6,999,021 B2 * | 2/2006 | Taylor et al. | 342/22 |
| 2003/0193429 A1 * | 10/2003 | Campana et al. | 342/22 |

FOREIGN PATENT DOCUMENTS

| | | |
|---|---|---|
| JP | 9333194 | 2/1997 |
| JP | 2002 257744 | 9/2002 |
| JP | 2004500550 | 1/2004 |
| WO | 96 19737 | 6/1996 |
| WO | WO 01/18561 | 3/2001 |
| WO | 02 063334 | 8/2002 |
| WO | 03 034094 | 4/2003 |

* cited by examiner

SHORT-RANGE RADAR HAVING A MULTIPLE SENSOR SYSTEM FOR DETERMINING THE LOCATION OF OBJECTS ENCLOSED IN A MEDIUM

FIELD OF THE INVENTION

The present invention relates to a radar instrument, in particular a hand-held short-range radar for determining the location of objects enclosed in a medium, and to the method on which the instrument is based. Such an instrument uses a radar sensor device, which generates a high-frequency detection signal in the form of a wideband electromagnetic pulse and transmits this pulse into the medium to be tested. An object enclosed in the medium reflects the incoming pulse. Information regarding the object enclosed in the medium may be obtained via detection and analysis of the reflected detection signal in the instrument.

BACKGROUND INFORMATION

A radar device of this type is known, for example, from PCT Published International Patent Application No. 96/19737. Objects enclosed in a wall or in the ground, for example, may be detected with high precision via a radar device. Thus, for example, when drilling in a wall, the worker should obtain accurate information about a location of the objects enclosed therein, i.e., the position on the wall surface and the depth in the wall, to protect these enclosed objects such as steel reinforcements, power lines, water ducts, and the like, from damage.

A radar device usually includes, as also described in PCT Published International Patent Application No. 96/197371, a "front end," i.e., a transmission and reception unit, and a display device. The front end disclosed in PCT Published International Patent Application No. 96/19737 A1 has, as set forth above, a shielded space for electric circuits and two spaces adjacent to this space, which are designed as a transmission antenna and a reception antenna. The cavities for the transmission and reception antennas are in the shape of horns, in which radiating elements (for example, in the form of wires) are installed. The space accommodating the circuits are shielded by a housing installed on the PC board for the circuits and by the walls of the antenna horns, which are attached to the side of the PC board opposite the circuits.

PCT Published International Patent Application No. 02/063334 describes a radar device, i.e., an integrated circuit for a radar device in a hermetically sealed housing having a patch antenna formed from a bent sheet metal part. The compact radar device of PCT Published International Patent Application No. 02/063334, which may be manufactured inexpensively, has a cavity having a radiating element accommodated therein and a shielded space for electric circuits. The housing is shaped in such a way that it forms both the shielded space for the circuits and the cavity for the antenna element.

SUMMARY OF THE INVENTION

The short-range radar according to the present invention, and the method on which it is based, for determining the location of objects enclosed in a medium, processes the detection signal of the at least one radar sensor and at least one additional detection signal. Such a method uses a wideband pulse radar which generates a high-frequency detection signal in the form of an electromagnetic pulse, sends this pulse into the medium to be tested, and detects and analyzes the pulse reflected by the medium or the object enclosed in the medium. Information regarding the position of the object enclosed in the medium may be obtained by analyzing the high-frequency detection signal. Such radar sensors or radar detectors, which emit radar pulses (ultra-wideband radar UWB) are particularly, but not exclusively, well suited for detecting objects concealed in walls. In addition, the method according to the present invention analyzes at least one further detection signal. This additional detection signal advantageously allows additional information to be obtained about the enclosed object.

In addition to merely determining the location of the object, i.e., determining the position and depth of the object, the combination of the information obtained from the at least two detection signals also allows, for example, the object material to be identified. Thus, for example, a distinction is able to be made between different materials. If such an instrument is used, for example, before drilling deep holes in a wall, in addition to merely determining the location of the object in advance, information about the "dangerousness" of the objects enclosed in the medium may also be obtained. Thus, for example, power-conducting lines may be distinguished from wooden beams and the like.

Using an appropriate circuit, the antenna(s) of the radar sensor may also be used as capacitive sensors. According to the type of selected triggering, the antenna sheets may thus also be used as electrodes of a measuring capacitor. No additional capacitor surfaces which would increase the required installation space for the instrument are necessary in this advantageous embodiment. In this way, a compact, in particular hand-held, instrument may be implemented. Depending on the excitation signal, high-frequency capacitive sensors, but also common low-frequency sensors such as used in "stud finders," for example, are implementable. For example, the triggering of the antenna device may be modulated in such a way that it is switched back and forth between high-frequency excitation and low-frequency operation ("quasi-simultaneous operation"). It is also possible, for example, to trigger the antenna of the radar sensor according to the present invention in such a way that it operates as a line voltage detector capable of capacitively detecting the AC voltage field of a power line, for example. In this case, the antenna operates in a passive mode, i.e., without generating an electric field, thus making it possible to display the position and course of power lines in walls, for example.

In the method according to the present invention, it is therefore possible to use a single sensor to generate a series of different detection signals, which, upon analysis, provide the user of an appropriate instrument with additional information about an enclosed object.

In addition, the use of additional detection signals allows more accurate determination of the location of the enclosed objects, because the sensor generating the first detection signal may be optimized and adapted to the specific measuring situation on the basis of the measurement results of the second detection signal. For example, a capacitive sensor recognizes a single-plank wooden wall by measuring the dielectric impedance. The radar sensor integrated into the device may be operated in such a way that air inclusions, although measured, are not displayed by the instrument. This may be achieved, for example, by having the signal processor downstream from the radar sensor average out the signals of the air inclusions via known averaging procedures. In this way, the operation of the radar sensor may be optimized.

In one embodiment of the instrument according to the present invention, i.e., of the method on which the instrument is based, the at least one additional detection signal, which is used for analyzing and obtaining information, is generated by at least one additional sensor. The use of separate sensors for the different detection signals makes it possible to perform the measurements simultaneously, thus reducing the measuring time.

An inductive sensor therefore allows a distinction to be made between metallic and non-metallic objects. In addition, for example, precalibration of inductive sensors is not required, because it may be performed automatically if, for example, the radar sensor recognizes that no object is present.

The method according to the present invention also advantageously allows a targeted search for certain objects to be performed. Thus, for example, a search for electric cables or metals may be performed using an appropriate circuit which activates a predefined search routine. Cavities or other objects in the wall which do not meet the search criteria may also be removed from the display of the instrument, so that a user only gets the desired information. Thus, the method according to the present invention makes it possible, for example, for the display of the instrument to show metals, power-conducting lines, plastics, wooden objects or cavities consecutively or simultaneously. In this way it is also possible, for example, to measure material thicknesses such as of concrete ceilings in reinforced concrete constructions or floor thicknesses for floor heating systems using the instrument according to the present invention.

In an advantageous embodiment of the method according to the present invention, the detection signals of an entire array of sensors are used for analysis. These sensors may be radar sensors, capacitive sensors, inductive sensors, photometric sensors such as infrared sensors or ultrasound sensors, for example. These sensors are connected individually or in groups. This may take place, for example, manually or automatically, i.e., controlled by an appropriate routine, which is stored in a memory element of the instrument.

In an advantageous analysis routine of the method according to the present invention, the detection signals of all active sensors may be analyzed, using exclusively those having an unambiguous signal for the downstream data processing. The measurement results of the other sensors are then ignored. If an inductive sensor detects metal objects of different sizes in the floor when measuring a floor heating system, the weaker signals may be eliminated, because they result from a construction steel mat in the floor. However, if the inductive sensor detects only one type of metal object and a radar sensor also does not detect any additional objects, the signals detected by the inductive sensor represent metal pipes of the floor heating system. However, if the radar sensor detects additional objects, these additional objects are plastic pipes of the floor heating system. The metal objects may then be again accordingly eliminated from the display of the measurement results. In this way, it is possible to make only the relevant information visible.

In particular, it is also advantageously possible to optimize a sensor or the detection signal of a sensor used for the measurement via analysis and recognition of the at least one additional detection signal. Thus, in one embodiment of the method according to the present invention, different "programs" may be included in the triggers of the individual sensors, for example, a "metal program," a "perforated brick" program, a "plastic program," etc. Such special search programs may be assigned to individual sensors which have special advantages in detecting such an object. If a special programmed-in scenario is detected during measurement by one or more sensors, i.e., one or more sensors indicate a special material, for example, all sensors are set to this program, or the sensor trigger and analysis are optimized to the material which is now known. In this way, it is possible to obtain more accurate results, because, for example, this makes it possible to work with individual sensor sensitivities tuned to the identified object.

In an advantageous embodiment of an instrument according to the present invention, a plurality of sensors are integrated into a shared housing of the instrument. The sensors may then be situated on a shared PC board, for example. It is advantageous, for example, to align all sensors to a common axis, so that the corresponding detection signals are directed to one and the same point.

If the device has a distance sensor system, it is possible not only to measure the instantaneous signal levels of the different sensors, but also to detect and display signal curves. This makes possible a two-dimensional representation in the display of the instrument, which shows not only the distance information but also the depth information. This advantageously differs from the metal location-determining devices of the related art, in which the instantaneous measurement result at the measurement site is usually displayed via one or more optical signal lights.

In contrast, in alternative embodiments of the instrument according to the present invention, it is possible to integrate part of the sensors on a shared circuit board and part elsewhere in the instrument housing, for example, in a housing bottom of the device.

A particularly advantageous embodiment of the instrument results from the use of external sensors which may be coupled to the instrument and the sensors located therein via a plug-and-socket module and an appropriate interface.

For example, an entire array of different sensors may be integrated into the instrument during the manufacture of this device, and these sensors may be enabled individually or in groups via appropriate trigger software. In this way the different requirements of different users may be taken into account using a mass-manufactured product.

The instrument according to the present invention is therefore designed as an inexpensive, compact multifunction device advantageously allowing simple, hand-held operation, for example, by the user moving the instrument on a wall to be tested. The measurement results are communicated to the user in an intuitive, easily accessible graphic form directly on a display of the instrument, so that the user is able to decide, by looking directly into the wall to be tested, at which point of the wall a hole may be safely drilled.

Further advantages of the method according to the present invention for determining the location of objects enclosed in a medium and of the corresponding instrument are described in the appended drawing and the description that follows.

DETAILED DESCRIPTION

Figure 1:
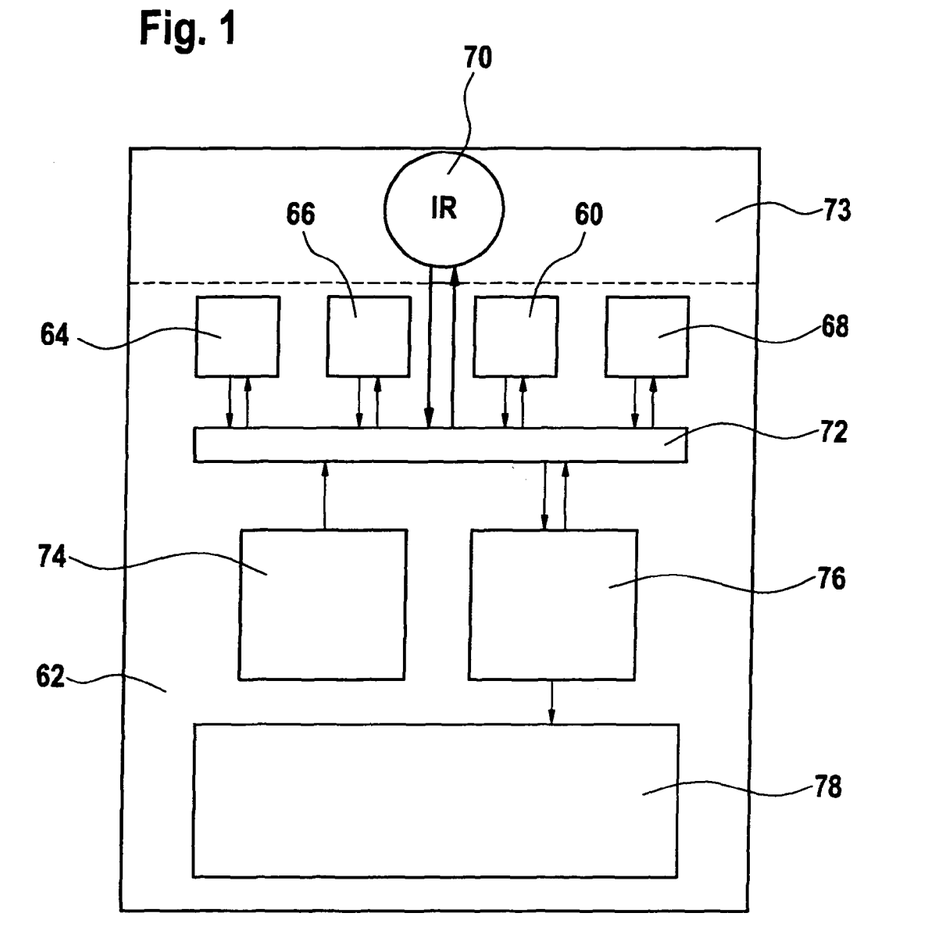
FIG. 1 shows a schematic structure of a radar instrument according to the present invention.

FIG. 1 shows a schematic depiction of the method on which the present invention is based and the schematic structure of a radar instrument for the method according to the present invention. In addition to a radar sensor 60, inventive instrument 62 according to the exemplary embodiment of FIG. 1 has an inductive sensor 64, a capacitive sensor 66, a capacitive high-frequency sensor 68, and a photometric sensor 92 in the form of an infrared detector 70. Further sensors may be present in other exemplary embodiments.

The individual sensors are triggered and their signals are analyzed by a central control unit 72. In the method according to the present invention, the sensors may be switched either individually or in groups, i.e., all together. The operating mode, i.e., the particular sensors to be used for a certain measurement, may be selected via a manual operation selector switch 74, which is integrated into an operator panel, for example, a keypad or a program menu of the instrument, and may be operated by a user after the selection. In addition to this manual selection of the operating mode by the user, automatic operation selection (automatic operation) is also possible via an appropriate control program, which may be stored in a memory medium of the instrument.

The method according to the present invention makes it possible to use the different sensors either simultaneously, quasi-simultaneously, or consecutively. In the quasi-simultaneous mode of operation, the system rapidly switches between the individual sensors and the corresponding detection signals are generated, measured, and analyzed and/or temporarily stored for analysis if necessary. An automatic or a user-defined sensor selection may be chosen.

The individual measuring signals of the sensors are analyzed by an appropriate analyzer unit 76, compared to one another, and then the individual sensors are optimized, for example, as a function of the measurement results of other sensors. Thus, in one embodiment of the method according to the present invention, different "programs" are to be incorporated into the triggers of the individual sensors, for example, a "metal program," a "perforated brick program," a "plastic program," etc. Such special search programs may be assigned to the individual sensors. If a special, programmed-in scenario is recognized during a measurement by one or more sensors, i.e., if some sensors provide indications of a special material, for example, all sensors are switched to this program and thus provide more accurate, optimized measurement results, because, for example, it is then possible to work using optimally tuned sensitivities of the individual sensors.

In an advantageous analysis routine of the method according to the present invention, it is possible to analyze the detection signals of all active sensors and to use exclusively those having an unambiguous signal for downstream data processing. The measurement results of the other sensors are then ignored for the further analysis.

A data processing unit and a display 78 are connected downstream from analyzer unit 76. The data of analyzer unit 76 are processed and converted to a form of display that is intuitively accessible to the user. Thus, the measurement result may be converted into the form of a graphic display of the present measurement situation. The measurement signal is transmitted to the user, in real time in particular, in the form of a sectional representation through the wall tested via a display integrated into the instrument.

Thus, all sensor signals may be analyzed using main component analysis of neural networks, for example, and the most likely result may be output via the display using pattern recognition during data processing. An appropriate routine allowing each sensor to add input to the result, weighted according its detection limits, may also be provided. This makes it possible to have an overall result having "soft" limits, despite the fact that each individual sensor has a fixed detection limit. The use of fuzzy logic, for example, is advantageous in this case.

The individual sensors provided for the method may all be integrated into a housing of the instrument; it is also possible to implement special adaptive variants of the instrument according to the present invention. Additional detectors such as infrared detector 70, may be modularly installed on instrument 62 together with radar sensor 60, capacitive high-frequency detector 68, and an inductive detector 64, for example. Infrared sensor 70 may then also be triggered and analyzed via actual instrument 62 using a shared interface.

Figure 2:
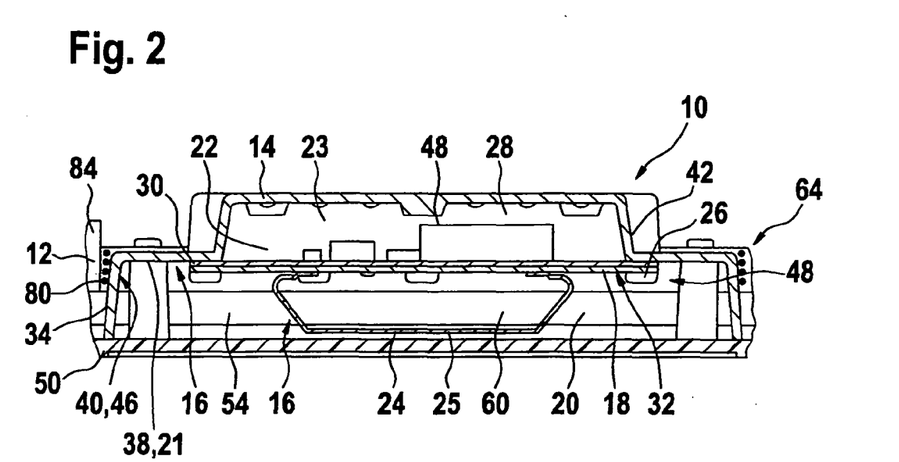
FIG. 2 shows a section of the sensor device of a first exemplary embodiment of the radar instrument according to the present invention.

FIG. 2 shows a section of the front end, i.e., sensor head 10, of an instrument according to the present invention. Instrument 62, which is only depicted partially in the exemplary embodiment of FIG. 2, has a radar sensor 60 and an inductive sensor 64 in the form of a coil.

Sensor device 10 has a housing 14 having a conductive surface. Housing 14 may be manufactured from a metal as a one-piece die-cast part or via a molding process from metallized plastic. Metallically conductive coatings are also possible for housing 14 of the sensor device. The sensor housing is open on one side toward a measured object, encloses essential components of the sensor device, and is itself an integral component of this sensor device.

Sensor device 10 essentially has three component groups. The first group of these components is electric circuits 48 for generating and processing the measuring, i.e., detection, signals. The second group of components of the sensor device includes the actual radar sensor, which is implemented as a specially configured antenna 16 in the location-determining device according to the present invention. A coil system 12 is provided around housing 14 of the sensor device as a third group of components, and together with the appropriate electronic circuits and components 48, it forms an inductive sensor for detecting metallic objects in particular.

The above-named three different subassemblies are situated in different subspaces of sensor head 10, separated from one another. While coil system 12 of the inductive sensor is situated outside housing 14, electric circuits 48 and the antenna of radar sensor 60 are located within the housing, but are separated from one another by a PC board 18. In housing 14, PC board 18 is attached at its edges to housing 14. For this purpose, in the exemplary embodiment of FIG. 2, the housing has a characteristic shoulder 42 onto which PC board 18 is placed. Thus shaped housing 14 is built into a housing (not depicted in detail) of the location-determining device in such a way that the two subspaces for the electronics and radar sensor are situated on top of one another. Subspaces 20 and 22 are separated by PC board 18 in such a way that a first open subspace 20 for the radar sensor and a second enclosed subspace 22 for the electronic components are formed. Second subspace 22 is formed by a recess 28 of housing 14 and by PC board 18, which is permanently bonded to the housing. A metallized layer 30 is advantageously integrated on or in PC board 18 in such a way that subspace 22 of housing 14 is enclosed by an electrically conductive surface. In this way, subspace 22 forms a "Faraday cage" 23, which makes it possible to insulate the electronic components situated in subspace 22 against electromagnetic interference.

As shown in FIG. 2, one side of PC board 18 carries electrical circuits and components 48 for generating and analyzing the measuring signal. An antenna sheet 24 of antenna 16 is attached to the other side of PC board 18.

First subspace 20 of housing 14 of sensor device 10, in which the radar sensor is installed, is essentially formed by surface 32 of PC board 18 and side walls 34 of housing 14.

Recesses 36 are integrated into side walls 34, which make is possible to anchor housing 14 of the sensor device into the housing of the instrument.

First subspace 20 of housing 14 is open on one side as a result of an opening 54 and essentially carries antenna 16 of radar sensor 60. The antenna is formed by antenna sheet 24 attached to PC board 18 and by internal surface 38 of subspace 20 of housing 14, which forms ground electrode 21 of the antenna system. In this way, it is possible to configure antenna 16 to be very compact.

First subspace 20 may be enclosed, as shown by the exemplary embodiment of FIG. 2, by a wall 50 of the corresponding instrument in the form of a radon, as long as this partitioning does not represent a barrier for the electric field of antenna system 16. For this reason, wall 50 may be implemented, for example, by one side of a plastic housing of the instrument according to the present invention. The instrument according to the present invention would be guided in this case, with housing wall 50 over the structure to be measured, for example, a ceiling or a floor. Wall 50 is also used for the mechanical protection of antenna sheet 24 of radar sensor 16 against damage.

The instrument according to the present invention has a distance sensor system, so that not only the instantaneous signal levels of the different sensors are measured, but also signal curves may be detected and displayed. This makes possible a two-dimensional representation in the display of the instrument, which shows not only the distance information but also the depth information. This advantageously differs from the location-determining devices of the related art, in which only the instantaneous measurement result at the instantaneous measurement site is displayed usually via one or more optical signal lights.

Coil elements 80 of coil system 12 of an inductive sensor 64 in the instrument according to the present invention are wound around housing 14 of the sensor device. Coil elements 80 may be installed on or cast into a bobbin 84, for example. Coil elements 80 are connected, via appropriate connecting means, to a power supply (not shown in detail) and electronic components 48 for triggering and analysis. In other embodiments, the inductive sensor device may also be integrated into plastic bottom 50 of instrument 62, for example.

Figure 3:
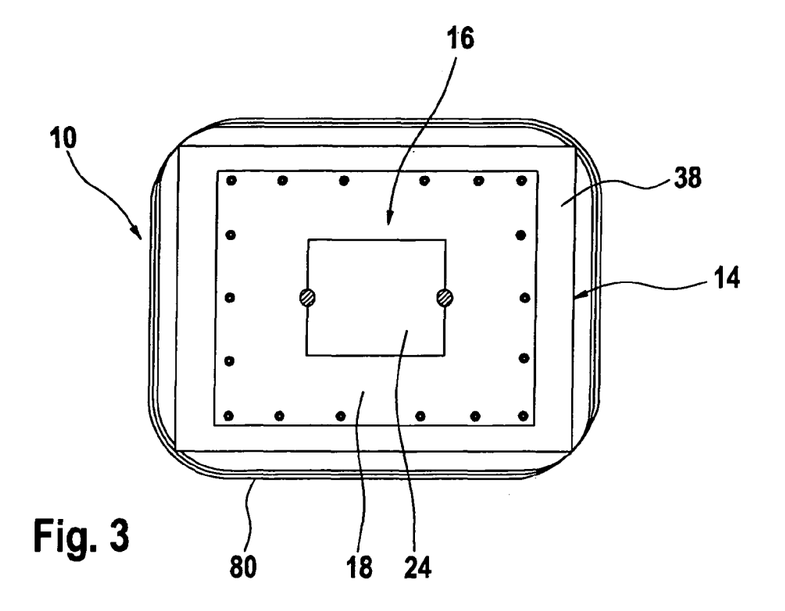
FIG. 3 shows a schematic bottom view of the exemplary embodiment of the inventive radar instrument according to FIG. 2.

In a simplified, schematic depiction, FIG. 3 shows a bottom view of sensor head 10 of an inventive instrument according to FIG. 2 with protective wall 50 removed. Antenna sheet 24 of antenna 16 is mounted approximately in the center on sensor board 18. Coil elements 80 of inductive sensor 64 of the instrument according to the present invention are situated around housing 14.

Through appropriate switching, the method according to the present invention also allows antenna 16 of radar sensor 60 to be operated as an ordinary, i.e., low-frequency, capacitive sensor 66 in the manner of a stud finder. For this purpose, the triggering of antenna 16 may be modulated in such a way that it is switched back and forth between high-frequency excitation and low-frequency operation, for example. It is also possible, for example, to trigger antenna system 16 of the inventive location-determining device according to FIG. 2 and FIG. 3 in such a way that it operates as a line voltage detector 65 capable of capacitively detecting the AC voltage field of a power line, for example. In this case, the sensor would operate in a passive mode, i.e., without generating an electric field, thus making it possible to display the position and course of power lines in walls, for example.

The trigger electronics provided in the instrument according to the present invention makes it possible to generate different detection signals with only one sensor, in the exemplary embodiment of FIG. 2 or 3 using antenna system 16 of radar sensor 60. These detection signals may then be analyzed quasi-simultaneously or consecutively, so that additional information about the object to be measured, enclosed in a medium, may be obtained by analyzing the additional information. Radar sensor 60 may also be triggered as a capacitive sensor, in particular as a conventional, i.e., low-frequency capacitive sensor 66, as a line voltage detector 65, or also as a high-frequency detector 68. The detection signals are then advantageously automatically directed to one and the same point on the surface to be tested. Thus always the same measuring area is tested, i.e., even when the detection signal is switched over. A measuring error due to the measurement of different areas may almost be ruled out in this exemplary embodiment of an instrument according to the present invention.

In an alternative exemplary embodiment, it is possible to also assign one particular stand-alone sensor, one antenna and one measuring capacitor, for example, to the different detection signals, so that strictly simultaneous operation is made possible to obtain multiple detection signals at the cost of a somewhat larger installation space.

The method according to the present invention also advantageously allows a targeted search for certain objects to be performed. Thus, for example, a search in particular for electric cables or metals may be performed using an appropriate circuit which activates a predefined search routine. Cavities present in the wall may then be hidden, i.e., not displayed, on the display of the instrument automatically or at the user's specification, so that a user selectively receives only the desired information.

Figure 4:
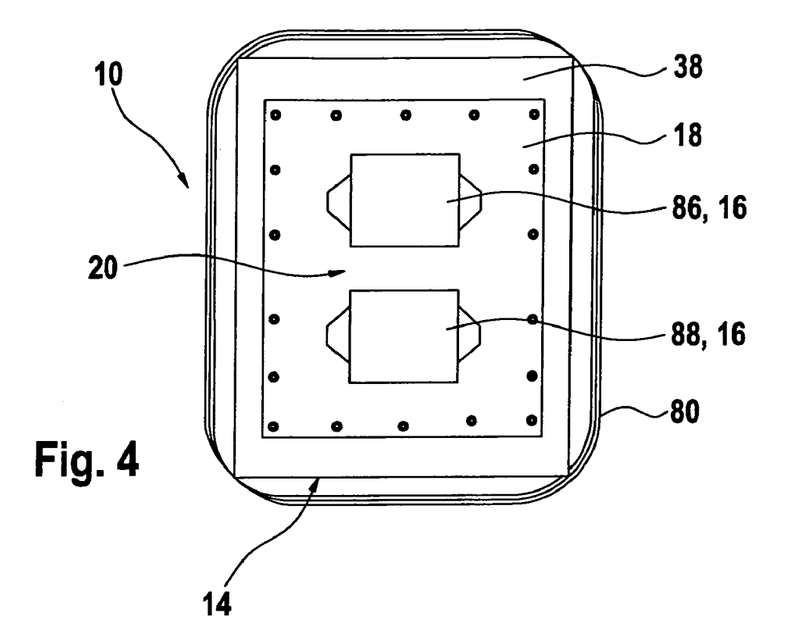
FIG. 4 shows a bottom view similar to that of FIG. 3 of the sensor unit of a second exemplary embodiment of a radar instrument according to the present invention.

FIG. 4 shows another exemplary embodiment of sensor head 10 of an instrument according to the present invention in a depiction similar to that of FIG. 3. Identical components are labeled using identical reference symbols. Sensor head 10 of the inventive instrument according to FIG. 4 has, in contrast to the previous exemplary embodiment, a transmitting antenna 86 and a receiving antenna 88 of a radar sensor 60.

Using appropriate triggering and/or geometric configuration of receiving antenna 86 and/or transmitting antenna 88 of radar sensor 60, it is possible to use one or both of these antennas also as electrode(s) for a capacitive sensor 65, 66, 68, in particular for capacitive high-frequency sensor 68. In this way it is no longer necessary to integrate an additional electrode or two additional electrodes into the housing of sensor head 10 for capacitive high-frequency sensor 68. The transmitting and receiving antennas of radar sensor 60 may also be implemented as a single antenna sheet as described above. The sensor head then has the same appearance as in FIG. 3. In this case, the trigger circuit of antenna 16 would first emit a radar pulse (transmitting antenna) and then switch the antenna over to receive, so that the reflected returning radar pulse is detected by the same antenna (now the receiving antenna).

Figure 5:
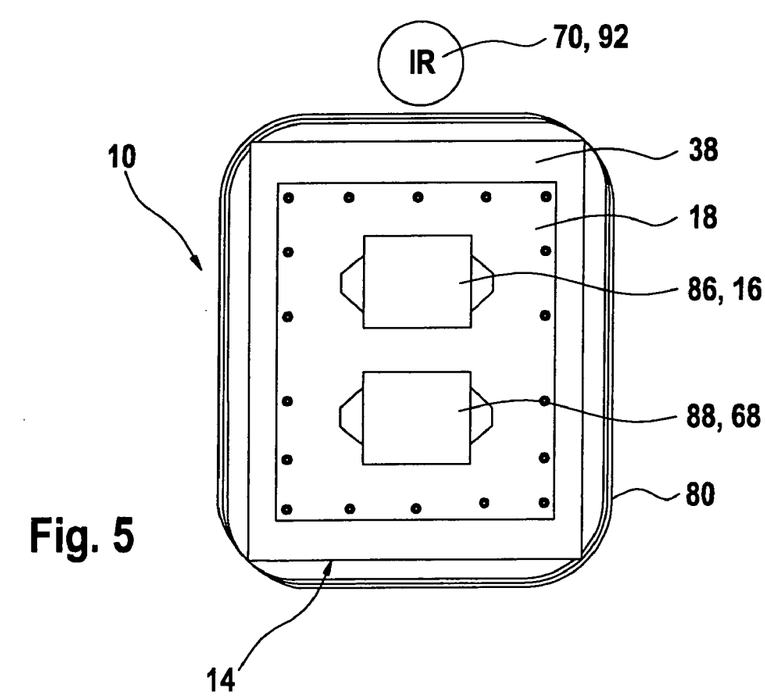
FIG. 5 shows a depiction similar to that of FIG. 3 and FIG. 4 of another exemplary embodiment of the sensor unit of a radar instrument according to the present invention.

FIG. 5 shows another exemplary embodiment of a sensor head of an instrument according to the present invention. In addition to coil elements 80 of inductive sensor 64, transmitting antenna 86 and/or receiving antenna 88 of radar sensor 60, which are also triggered as capacitive high-frequency sensor 68, a photometric sensor 92 in the form of an infrared sensor 70 is also integrated into sensor head 10 of the instrument according to the present invention.

Infrared sensors may be advantageously used where temperatures or temperature differences are to be measured. Thus, temperatures may be rapidly and reliably measured using modern IR sensors. In particular, even very high temperatures of over 1000 degrees C. may be reliably measured, because this measurement is performed without contact solely on the basis of the radiated heat.

Infrared sensor 70 of the instrument according to the present invention has, for example, a semiconductor photodiode, whose conductivity varies with the incident radiation intensity, this photodiode being sensitive specifically to wavelengths in the range over 1 µm (infrared radiation).

The use of the inventive instrument according to the exemplary embodiment of FIG. 5, for example, in scenarios like floor heating systems, heating pipes, etc., i.e., in measuring water pipes enclosed in floors, walls, or ceilings, is of interest. Here one would like to know, for example, where the pipes are located, to avoid damage during drilling or to locate the exact position of the pipe in the event of a pipe rupture that has already occurred. In conventional methods IR sensor devices, heat imaging cameras, or thermofoils are used, for example. Using such IR sensor devices of the related art, the area to be tested is slowly scanned and the local temperature maximums are recorded. Heat imaging cameras generate, in principle, photos in the infrared range, which are capable of making slight temperature differences visible. Thermofoils are made of a temperature-sensitive material, which changes color at higher temperatures. The foils are to be glued onto the area to be tested. In all of these methods, however, no depth information of the detected objects may be obtained.

In contrast to the devices of the related art, the location-determining device according to the present invention combines a plurality of sensor principles to make possible rapid and high-performance location determination and measuring of heated or cooled pipes in walls, ceilings, or floors. While IR sensor 70 is able to roughly classify, i.e., differentiate between a heated or cooled pipe, and determine the approximate position of the pipe, further sensor principles integrated into the instrument according to the present invention also allow the exact position, depth, and size of the pipes to be determined.

FIG. 5 shows sensor device 10 as shielded housing 14, which contains sensor board 18 for the additional sensor system. Antennas 86 and 88 of radar sensor 68 are soldered onto sensor board 18. The antennas are also used, in addition to for radar detection, as a capacitive high-frequency sensor 68 and/or capacitance sensor 65, 66, with the aid of an appropriate interconnection. For this purpose, intelligent software or appropriate electronics rapidly switch between the individual operating modes of these sensors. For this purpose, a coil system 80 is wound around housing 14 for inductive detection. A ferrite may optionally be provided for the coil. The type, size, and position of the coil windings may be specially configured.

Infrared sensor 70 may be located within housing 14, for example, on sensor board 18. However, it is typically better to situate it outside the housing due to the mutual influences of the sensors. In an advantageous embodiment of the instrument according to the present invention, infrared sensor 70 is designed as a removable IR sensor head 73 and is provided as an additional component 73 for an appropriate capacitive high-frequency location-determining device. The infrared sensor may then be coupled to the control and analysis unit of the instrument via an appropriate interface at the location-determining device and be triggered and analyzed thereby.

In different exemplary embodiments of the instrument according to the present invention, the type of integration of the sensor principles used may be implemented in any desired manner. The position, size, and number of sensors are not limited. The data obtained from the additional detection signals may be advantageously further processed and thus yield additional information about the enclosed object.

The measuring results of the individual sensors may be supplemented via appropriate data processing (software) and thus result in the most complete possible picture about the enclosed object.

Analysis of a plurality of detection signals obtainable from a combination of a plurality of sensors or from different types of triggering of the same sensor advantageously also allows material identification or, in the case of power lines, information about the voltage status of the lines, for example, to be obtained in addition to the location of the enclosed object. The combination of a radar sensor with an infrared sensor, for example, makes not only the determination of the location of water ducts possible, but may also provide information about the direction of flow within the pipes on the basis of the different temperature levels in such a line. By using additional detection signals obtained simultaneously or consecutively, the radar location determination and its depth estimate become considerably more accurate, because the particular sensor may be set and optimized for the type of material of the located object.

It is thus possible to optimize an individual sensor on the basis of the information obtained via the other sensors about the enclosed object. In this way it is possible for each sensor unit taken individually to operate better due to the additional information of the other sensors. These optimized independent results may be combined via software or hardware in such a way that the location-determining device according to the present invention is able to communicate to the user the position, depth, width, as well as type of material and temperature, even of objects located at great depths.

The instrument according to the present invention is thus designed as an inexpensive, compact multifunction device, which advantageously allows simple, hand-held operation. For this purpose, the user passes the instrument over a wall to be tested, for example. The measuring results are communicated to the user in an intuitive, easily accessible, graphic representation, directly on a display of the instrument, so that the user is thus able "to have a look directly into the wall to be tested." The user may thus decide, for example, at which point of the wall a hole should not be drilled or at which point drilling is safe.

The location-determining device according to the present invention and the method on which it is based for determining the location of an object enclosed in a medium is not limited to the exemplary embodiments shown in the figures.

In particular, the method according to the present invention is not limited to the detection of objects enclosed in walls, floors, or ceilings.

What is claimed is:

1. A hand-held short-range radar device for determining a location of objects enclosed in a medium, comprising:
at least one radar sensor that generates a first, high-frequency detection signal for penetrating a medium to be tested in such a way that information about an object enclosed in the medium can be obtained by measuring and analyzing a reflected detection signal of the at least one radar sensor; and
at least one additional sensor for generating at least one additional, second detection signal for obtaining information about the object enclosed in the medium,
wherein the information about the object enclosed in the medium includes position and depth information,
wherein at least one sensor is optimized on the basis of information obtained from the other sensors, and
wherein the optimization occurs by setting the at least one sensor to a program detected by the other sensors.

2. The hand-held short-range radar device as recited in claim 1, wherein the at least one additional sensor is an inductive sensor.

3. The hand-held short-range radar device as recited in claim 1, wherein the at least one additional sensor is a capacitive sensor.

4. The hand-held short-range radar device as recited in claim 3, wherein at least one electrode of the capacitive sensor is formed by at least one antenna of the at least one radar sensor.

5. The hand-held short-range radar device as recited in claim 1, wherein the at least one additional sensor is a photometric sensor.

6. The hand-held short-range radar device as recited in claim 5, wherein the at least one additional photometric sensor is an infrared sensor.

7. The hand-held short-range radar device as recited in claim 1, further comprising: a housing in to which the at least one radar sensor and the at least one additional sensor are integrated.

8. The hand-held short-range radar device as recited in claim 7, further comprising: a shared PC board onto which the at least one radar sensor and the at least one additional sensor are situated.

9. The hand-held short-range radar device as recited in claim 1, wherein the at least one radar sensor is a wideband pulse radar sensor.

10. A method for determining a location of an object enclosed in a medium, comprising:
generating a first, high-frequency detection signal with the aid of at least one antenna of a radar sensor;
transmitting the first detection signal into the medium to be tested, so that information about the object enclosed in the medium is obtained by measuring and analyzing the first detection signal;
analyzing at least one additional, second detection signal for obtaining information about the object enclosed in the medium,
wherein the information about the object enclosed in the medium includes position and depth information,
wherein at least one sensor is optimized on the basis of information obtained from the other sensors, and
wherein the optimization occurs by setting the at least one sensor to a program detected by the other sensors.

11. The method as recited in claim 10, wherein the measuring and analyzing of the first detection signal is performed by measuring a reflected radar signal.

12. The method as recited in claim 10, further comprising: operating at least one antenna of the radar sensor, at least intermittently, as an electrode of an additional sensor.

13. The method as recited in claim 12, wherein the additional sensor is a capacitive sensor.

14. The method as recited in claim 10, wherein the at least one first detection signal and the at least one second detection signal are measured simultaneously.

15. The method as recited in claim 10, wherein the at least one first detection signal and the at least one second detection signal are measured simultaneously.

16. The method as recited in claim 10, wherein the at least one first detection signal and the at least one second detection signal are measured quasi-simultaneously.

17. The method as recited in claim 10, wherein the at least one first detection signal and the at least one second detection signal are measured sequentially.

18. The method as recited in claim 10, wherein the detection signals of a plurality of sensors are measured and analyzed, the sensors originating from a group of sensors which includes at least capacitive sensors, inductive sensors, and photometric sensors.

19. The method as recited in claim 10, wherein at least one detection signal of a sensor is optimized by measuring and analyzing at least one additional detection signal.

20. The hand-held short-range radar device as recited in claim 1, wherein only unambiguous signals are sent downstream to a data processing unit.

21. The hand-held short-range radar device as recited in claim 20, wherein the unambiguous signals are sent downstream to the data processing unit after analysis by an analyzer unit.

* * * * *